(12) United States Patent
Gorham

(10) Patent No.: US 12,179,449 B2
(45) Date of Patent: Dec. 31, 2024

(54) TRANSFER TOOLING FOR VARYING TIRE BELT SIZES

(71) Applicant: The Steelastic Company, LLC, Cuyahoga Falls, OH (US)

(72) Inventor: Eric William Gorham, Stow, OH (US)

(73) Assignee: The Steelastic Company, LLC, Cuyahoga Falls, OH (US)

( * ) Notice: Subject to any disclaimer, the term of this patent is extended or adjusted under 35 U.S.C. 154(b) by 546 days.

(21) Appl. No.: 17/003,024

(22) Filed: Aug. 26, 2020

(65) Prior Publication Data

US 2021/0060884 A1 Mar. 4, 2021

Related U.S. Application Data

(60) Provisional application No. 62/895,740, filed on Sep. 4, 2019.

(51) Int. Cl.
*B29D 30/30* (2006.01)
*B29D 30/00* (2006.01)
*B65G 17/24* (2006.01)

(52) U.S. Cl.
CPC ..... *B29D 30/3007* (2013.01); *B29D 30/0016* (2013.01); *B65G 17/24* (2013.01)

(58) Field of Classification Search
CPC .... B29D 2030/4493; B29D 2030/4468; B29D 2030/0038; B29D 30/0016; B29D 30/16;

(Continued)

(56) References Cited

U.S. PATENT DOCUMENTS 2,317,348 A * 4/1943 Wekeman ............... G03B 27/60
269/21
2,723,775 A * 11/1955 Von Hofe ................. B65C 9/08
269/21

(Continued)

FOREIGN PATENT DOCUMENTS

CN 1900407 A 1/2007
CN 101107119 A 1/2008

(Continued)

OTHER PUBLICATIONS

International Search Report and Written Opinion from corresponding International Application No. PCT/US2020l047918, dated Dec. 9, 2020, 14 pp.

(Continued)

*Primary Examiner* — Sedef E Paquette
(74) *Attorney, Agent, or Firm* — Shook, Hardy & Bacon L.L.P.

(57) ABSTRACT

In one embodiment, a transfer system is configured to move a portion of a strip within a belt forming system. The transfer system may comprise a first segment comprising a main body adapted to engage a strip. A plurality of slots may be disposed in a surface of the main body. Fluid communication may be provided from a fluid supply to the plurality of slots, such that the fluid communication with the plurality of slots enables holding the strip against the main body or blowing the strip off the main body. The plurality of slots may be arranged in a series of rows, wherein a first slot in a first row is positioned directly adjacent to a second slot in the first row. First and second strips of different dimensions may be transferred without any mechanical adjustments being made to the main body.

15 Claims, 8 Drawing Sheets

(58) Field of Classification Search
CPC ............ B29D 30/1607; B29D 30/1621; B29D 30/1628; B29D 30/1642; B29D 30/165; B29D 30/30; B29D 30/3007; B29D 30/3021; B29D 30/3028; B29D 30/3042; B29D 30/305; B29D 30/3057; B29D 2030/2671; B29D 2030/2692; B65H 3/0883; B25J 15/0616; B25J 15/0625; B25J 15/0658; B25J 15/0683; B65G 47/91; B65G 47/912; B65G 17/24; B25B 11/005; B25B 11/007
USPC ...................................................... 156/405.1
See application file for complete search history.

(56) References Cited

U.S. PATENT DOCUMENTS

| | | | |
|---|---|---|---|
| 2,962,083 | A | 11/1960 | Hasselquist |
| 3,630,424 | A * | 12/1971 | Rau ................... B65H 27/00 226/95 |
| 3,888,713 | A | 6/1975 | Alderfer |
| 4,185,814 | A | 1/1980 | Buchmann et al. |
| 5,131,971 | A * | 7/1992 | Elia ................... B29D 30/46 156/266 |
| 6,209,867 | B1 * | 4/2001 | Madsen ............... B41J 11/0025 271/183 |
| 6,341,808 | B1 | 1/2002 | Baan |
| 6,533,891 | B1 | 3/2003 | Kubinski |
| 7,497,241 | B2 | 3/2009 | Bull et al. |
| 2002/0062908 | A1 | 5/2002 | Mancini et al. |
| 2007/0023952 | A1 | 2/2007 | Bull et al. |
| 2008/0185095 | A1 | 8/2008 | Gutknecht |
| 2008/0204732 | A1 | 8/2008 | Vodanovic |
| 2009/0311087 | A1 * | 12/2009 | Na ..................... H01L 21/6838 414/737 |
| 2015/0022634 | A1 | 1/2015 | Perez |
| 2016/0229141 | A1 | 8/2016 | Marchini et al. |
| 2018/0079087 | A1 * | 3/2018 | De Boer ............. B25J 15/0625 |
| 2018/0243933 | A1 | 8/2018 | Marabito |

FOREIGN PATENT DOCUMENTS

| | | |
|---|---|---|
| CN | 101878105 A | 11/2010 |
| CN | 204777793 U | 11/2015 |
| CN | 105189099 A | 12/2015 |
| CN | 108790229 A | 11/2018 |
| EP | 0434404 A2 | 6/1991 |
| EP | 0 495 604 A2 | 7/1992 |
| EP | 0 657 373 A2 | 6/1995 |
| EP | 0 714 758 A2 | 6/1996 |
| EP | 0956940 B1 | 11/1999 |
| EP | 1065043 A2 | 1/2001 |
| EP | 2 783 801 A2 | 10/2014 |
| JP | 54-083273 A | 7/1979 |
| JP | 07-157117 A | 6/1995 |
| JP | 11-048364 A | 2/1999 |
| JP | 2008-525223 A | 7/2008 |
| WO | WO2002/000421 | 1/2002 |
| WO | 02/55289 A1 | 7/2002 |
| WO | 2012/150662 A1 | 11/2012 |
| WO | WO2012/172462 | 12/2012 |
| WO | 2014/155258 A1 | 10/2014 |
| WO | WO 2016/167644 A1 | 10/2016 |
| WO | 2018/070299 A | 4/2018 |
| WO | 2018/151591 A1 | 8/2018 |

OTHER PUBLICATIONS

International Preliminary Report on Patentability from corresponding International Application No. PCT/US2020/047918, dated Mar. 8, 2022, 9 pp.

Office action received for Japanese Patent Application No. 2022-514546, mailed on Jul. 2, 2024, 10 pages (4 pages of Original OA and 6 pages of English Translation).

Office action received for Taiwanese Patent Application No. 109130097, mailed on Jun. 6, 2024, 6 pages of Original OA.

* cited by examiner

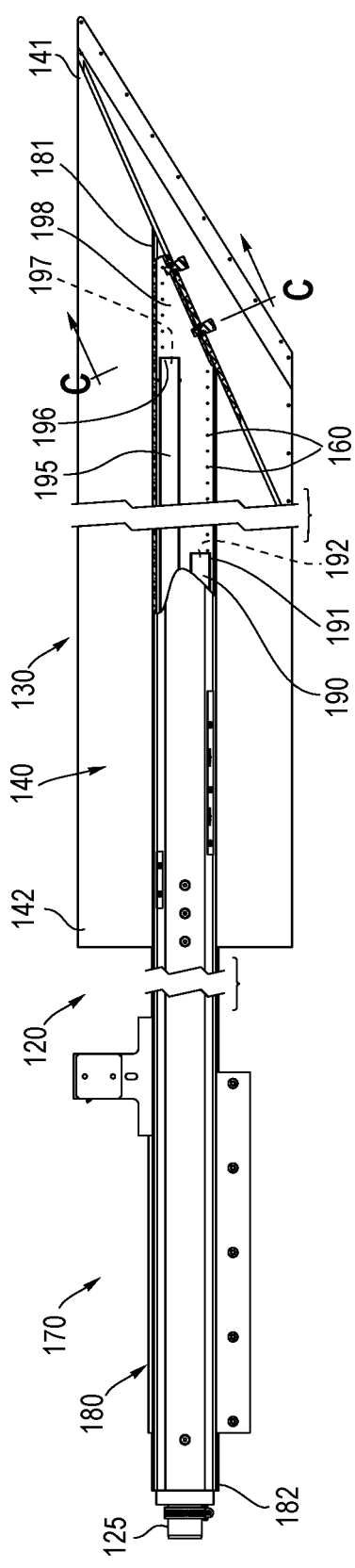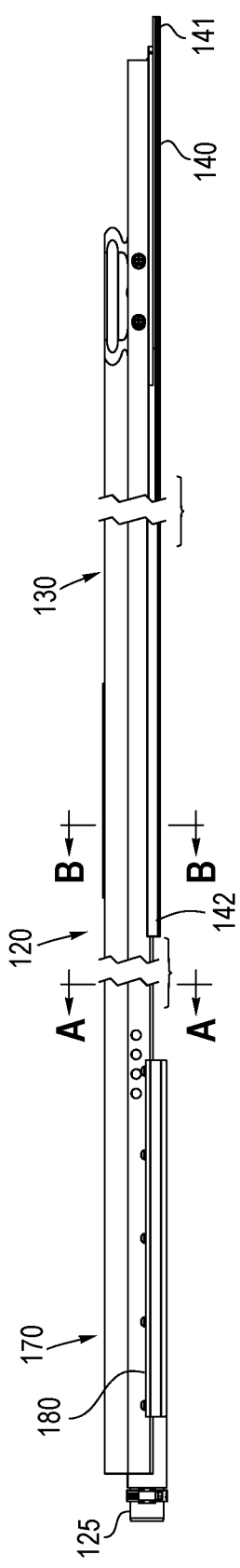

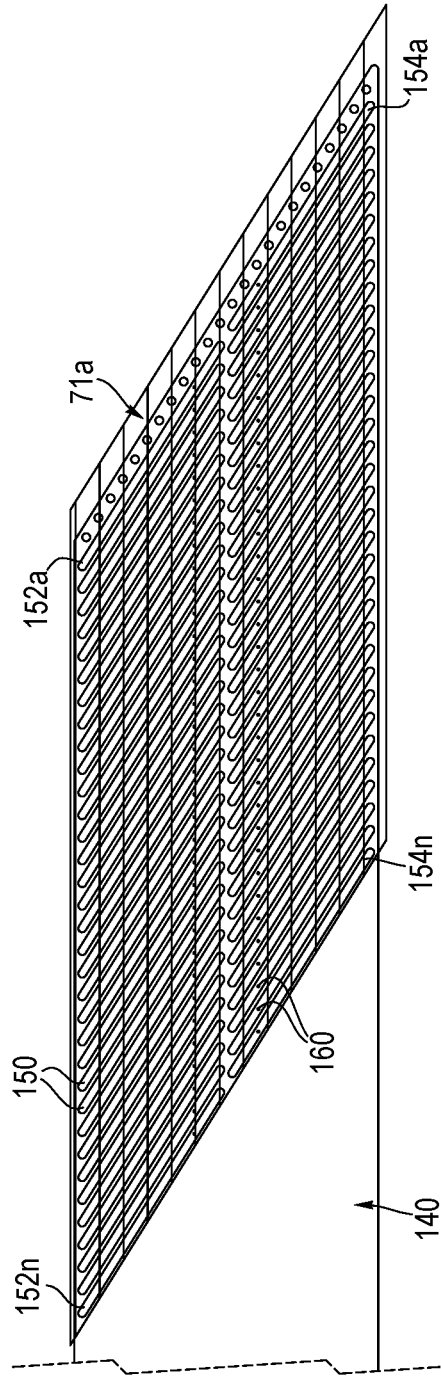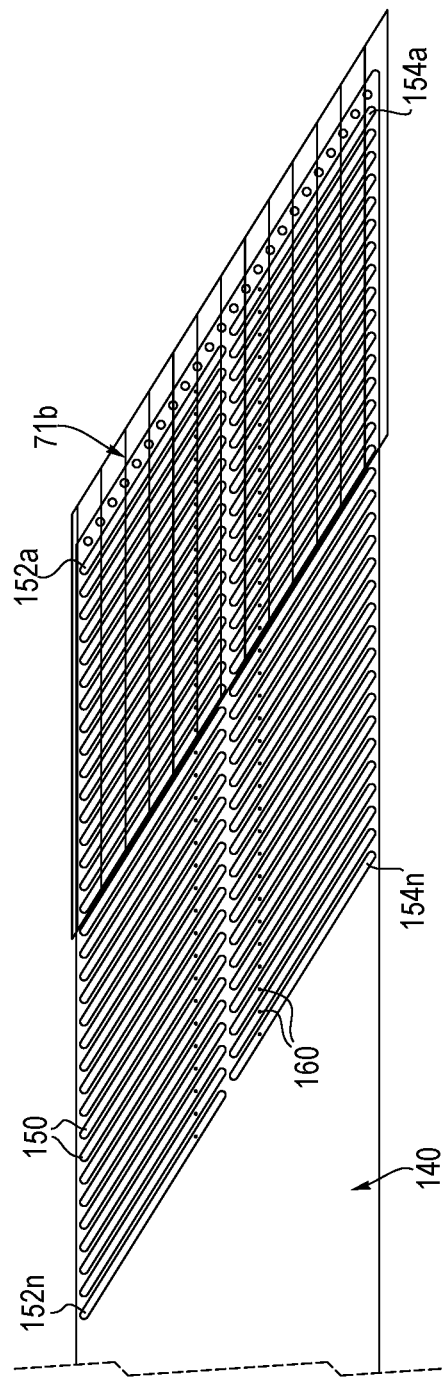

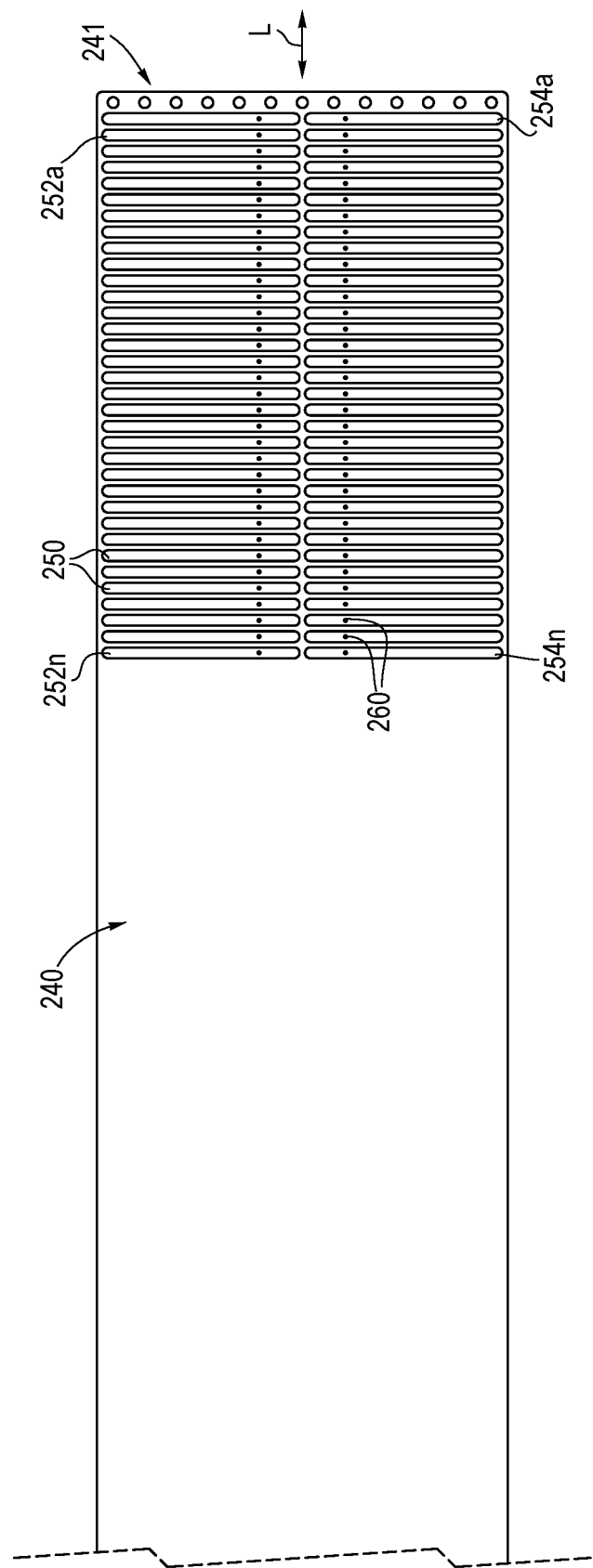

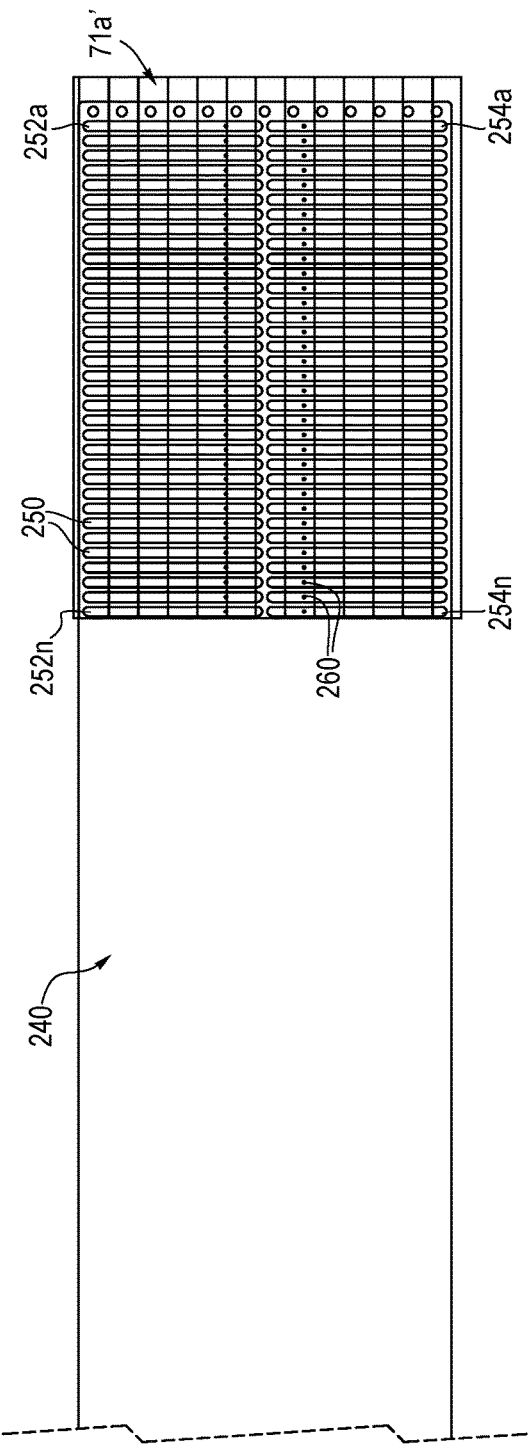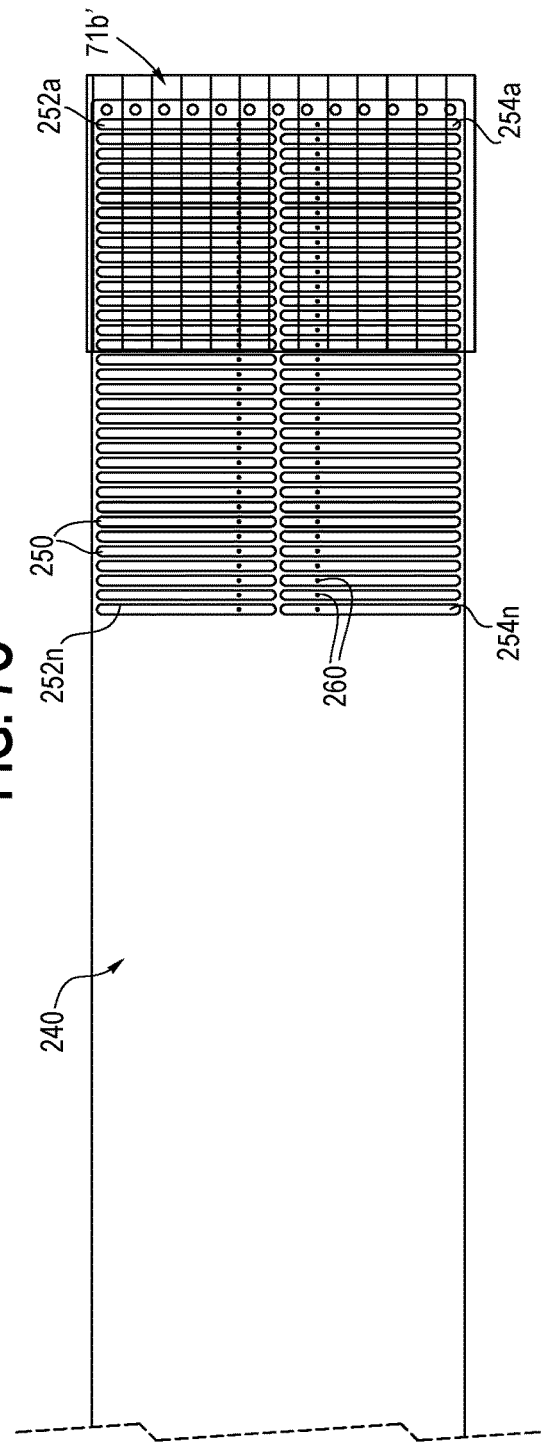

TRANSFER TOOLING FOR VARYING TIRE BELT SIZES

PRIORITY CLAIM

This invention claims the benefit of priority of U.S. Provisional Application Ser. No. 62/895,740, entitled "Transfer Tooling for Varying Tire Belt Sizes," filed Sep. 4, 2019, the disclosure of which is hereby incorporated by reference in its entirety.

BACKGROUND

The present embodiments relate generally to transfer systems and methods for handling a portion of a tire belt.

Tire belt formation techniques may involve pulling multiple cords through an extrusion die. The extruder heats elastomeric material, such as rubber, and coats the cords traveling through the die. Cooling drums adjacent to the extruder act both to pull the cords through the die and cool the reinforced material before the cutting and splicing phase of production. After traveling through the cooling drums, the fiber reinforced material may be allowed to hang with some slack in order to remove some residual forces. The fiber reinforced material then may be drawn onto a cutting station. In most current systems, the cutting station includes a strip vacuum transfer, a cutter and an outfeed belt conveyor. The strip vacuum transfer advances the fiber reinforced strip and positions it on the outfeed belt conveyor so that the cutter may cut the fiber reinforced material. The outfeed belt conveyor then indexes a predetermined distance. The strip vacuum transfer again advances the strip onto the conveyor so that the cutter again cuts it. This process results in a continuous belt of fiber reinforced material with the reinforcing cords lying at some angle typically not parallel to the central axis of the belt. The angle of the cords with respect to the lengthwise direction of the belt is known in the art as a bias angle.

The cut sections of this material overlap one another on the outfeed belt conveyor by a predetermined distance. This overlap is generally known in the art as a splice. A uniform splice is needed to maintain proper material strength and quality. The outfeed belt conveyor is typically aligned at an angle relative to the fiber reinforced material entering the cutting station, such that after the splicing process, a continuous strip of material lays on the conveyor, comprised of fibers or cords oriented at a predetermined bias angle.

Depending on the belt width that is being manufactured, a different amount of strip material comes into contact with the vacuum transfer tooling and is pulled through the cutter. Conventional transfer tooling utilizes an internal slide, which selectively closes off the vacuum chamber channel to either provide vacuum pressure or positive pressure to the tooling area that is contacting the strip, where the vacuum pressure retains the strip against the transfer tooling and the positive pressure blows the strip off the transfer tooling, respectively.

One drawback to such transfer tooling is that user intervention is required to operate the slide, particularly each time a strip of different width is selected for use. In each instance, the user must physically adjust the slide position to accommodate strip segments of different widths.

Further drawbacks arise in situations where the slide is not adjusted properly, which can yield a lack of vacuum pressure sufficient to allow the strip to be picked up and placed by the transfer tooling. For example, if the channel is adjusted to be more open than the desired strip length, then the open contact area that is not touching the strip will not allow a sufficient vacuum pressure to be generated adjacent to the strip, and the strip will not be picked up. On the other hand, if the channel is adjusted to be narrower than the strip length, then the front edge of the material will not have sufficient vacuum pressure to pick it up, and the material will roll-up when the transfer tooling attempts to move the material.

In each of these cases, another adjustment is required to get the transfer tooling to operate properly. This requires additional downtime of the machine, and further creates scrap each time a strip misfeed happens.

SUMMARY

In one embodiment, a transfer system is configured to move a portion of a strip within a belt forming system. The transfer system may comprise a first segment comprising a main body adapted to engage a strip, and a second segment coupled to a fluid supply. An elongate support may extend between a portion of the first segment and the second segment. A plurality of slots may be disposed in a surface of the main body. Fluid communication may be provided from the fluid supply to the plurality of slots, such that the fluid communication with the plurality of slots enables holding the strip against the main body or blowing the strip off the main body. The plurality of slots may be arranged in a series of rows, wherein a first slot in a first row is positioned directly adjacent to a second slot in the first row.

The main body comprises a horizontal centerline disposed equidistant between first and second lateral boundaries of the main body, and the first slot may be positioned between the horizontal centerline and the first lateral boundary, while the second slot may be positioned between the horizontal centerline and the second lateral boundary. In one example, an inner boundary of the first slot may be positioned less than 0.5 inches from an adjacent inner boundary of the second slot.

The transfer system may further comprise a plurality of holes, wherein a first hole provides fluid communication between the fluid supply and the first slot, and wherein at least one additional hole provides fluid communication between the fluid supply and a different slot than the first slot. In one example, a single hole may be provided to each of the plurality of slots, such that there is a one to one correspondence of holes to slots. Each of the holes may be confined within a perimeter of their respective slots. In one example, a diameter of the first hole is in a range between about 25-50% of a width of the first slot.

The first row may be closer to a front end of the main body, and a subsequent row of slots may be closer to a rear end of the main body. The first hole in the first row may comprise a diameter greater than a subsequent hole contained in a slot of the subsequent row. In one example, the first row always engages a strip regardless of dimensions of the strip, while the subsequent row engages strips of larger dimensions but lacks engagement with strips of smaller dimensions.

In one embodiment, first and second tubes extend along at least a portion of the elongate support. The first and second tubes facilitate the fluid communication between the fluid supply and the plurality of slots. In one example, the first tube has a downstream endpoint that terminates at a location upstream relative to a downstream endpoint of the second tube.

The transfer system may further comprise a chamber disposed adjacent to the main body, wherein the chamber enables fluid communication between the first and second tubes and the plurality of slots.

The present embodiments also provide for methods for transferring a portion of a strip within a belt forming system. In one example, the method comprises providing a transfer system having a first segment comprising a main body adapted to engage a strip, and a rear segment coupled to a fluid supply, wherein a plurality of slots are disposed in a surface of the main body. Fluid communication from the fluid supply may be provided to the plurality of slots, such that the fluid communication with the plurality of slots enables holding the strip against the main body or blowing the strip off the main body. A first strip of a first dimension is transferred by engagement with the main body. Subsequently, a second strip of a second dimension is transferred by engagement with the main body. The second dimension is different than the first dimension. The second strip may be transferred after the first strip without any mechanical adjustments being made to the main body. In one example, a first row of the plurality of slots engages each of the first and second strips, while a subsequent row of the plurality of slots engages the first strip only and lacks engagement with the second strip.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIGS. 2A-2C are, respectively, an elevated perspective view, a top view that is partially cutaway, and a side view of transfer tooling in accordance with a first embodiment.

FIGS. 6B-6C are bottom views depicting strips of different dimensions being placed against the main body of the transfer tooling of FIGS. 2A-2C.

FIG. 7A is a bottom view of a main body of transfer tooling in accordance with an alternative embodiment.

FIGS. 7B-7C are bottom views depicting strips of different dimensions being placed against the main body of the transfer tooling of FIG. 7A.

DETAILED DESCRIPTION OF THE PREFERRED EMBODIMENTS

Figure 1:
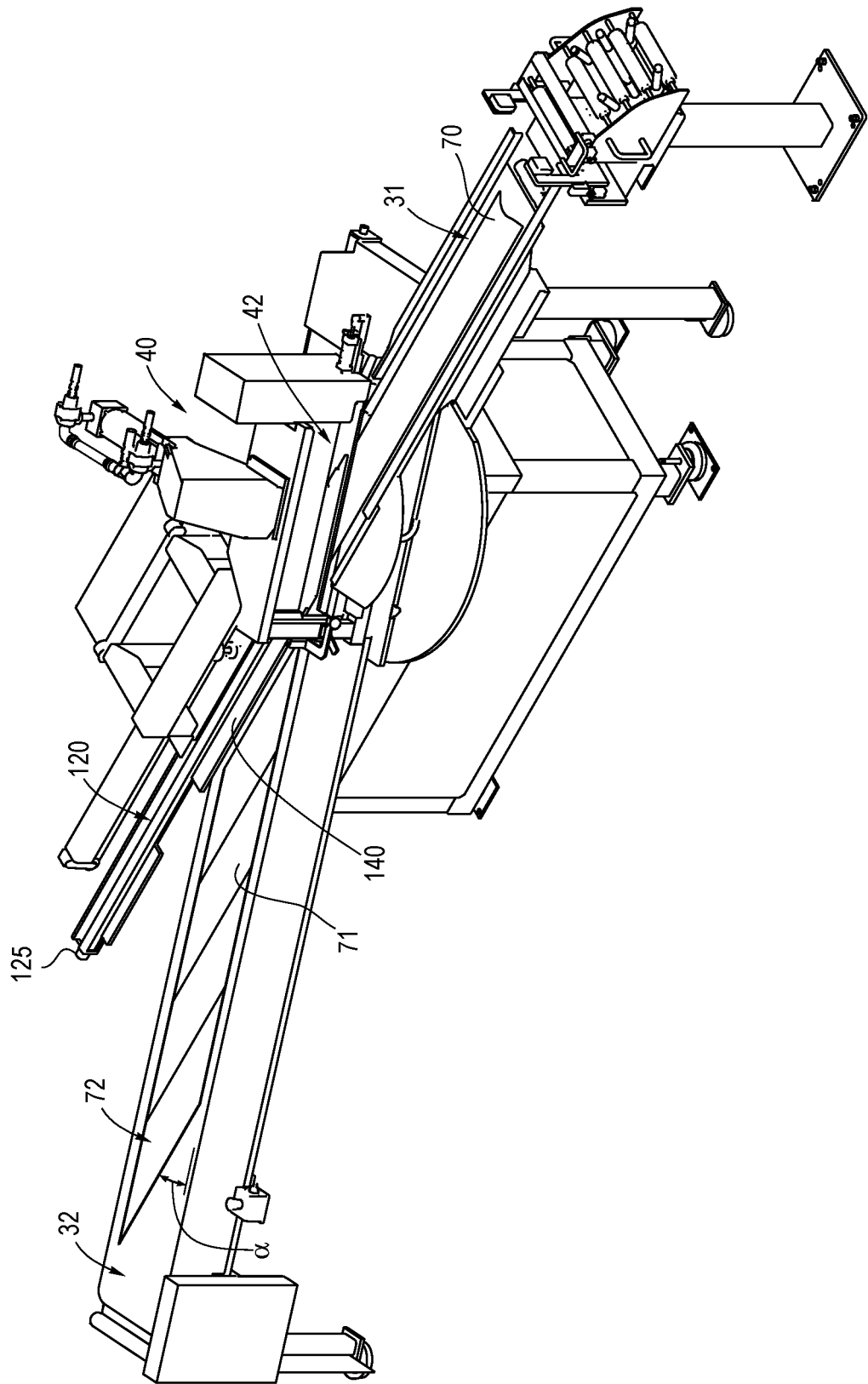
FIG. 1 is a perspective view of a belt forming system having first and second conveyors.

Referring to FIG. 1, an exemplary belt forming system is adapted to form a portion of a tire belt, depicted as bias belt 72, which is formed after cutting and positioning steps described below. Bias belt 72 is generally formed of an elastomeric material, such as rubber, and comprises a plurality of parallel cords, where the cords are oriented at an angle relative to the lengthwise direction of the belt equal to a bias angle $\alpha$. The belt forming system may comprise at least a first conveyor 31 and a second conveyor 32. In various embodiments, a conveyor may comprise a belt conveyor, a strip vacuum transfer, or any other device adapted to move a rubber strip along an exemplary path, as depicted by conveyors 31 and 32. In the depicted embodiment, a belt cutting system 40 is positioned at least partially between the first conveyor 31 and the second conveyor 32.

Rubber strip 70 is generally reinforced, and may be reinforced with a plurality of cords or fibers. It may have a plurality of steel cords running parallel to the lengthwise direction of the rubber strip 70. The rubber strip 70 is typically formed by a process where uncured rubber is extruded around the plurality of steel cords, but any process may be utilized. After its formation, the rubber strip 70 may be fed onto the first conveyor 31. The rubber strip 70 is often tacky and relatively soft when it is fed onto the first conveyor 31.

The first conveyor 31 may serve as an infeed conveyor adapted to feed the rubber strip 70 to the belt cutting system 40 or otherwise move the rubber strip 70 into communication with the belt cutting system 40. The belt cutting system 40 is adapted to cut the rubber strip 70. The cuts are preferably straight cuts oriented at a desired angle corresponding to the bias angle $\alpha$, and separate a strip section 71 from the rubber strip 70. The strip section 71 then moves onto the second conveyor 32.

The bias belt 72 comprises a plurality of the strip sections 71, where the steel cords of each strip section 71 may be substantially parallel. The strip sections 71 overlap one another on the second conveyor 32 by a predetermined distance, forming a uniform splice. After each splice is formed, an additional strip section 71 becomes a portion of the bias belt 72.

The belt cutting system 40 includes a belt cutter 42, which preferably comprises a knife or blade for cutting through the rubber strip 70. As depicted by FIG. 1, the belt cutter 42 may be embodied as a guillotine-style cutter, where a sharp knife or blade approaches the rubber strip 70 from above and continues with a downward force for cutting through the rubber strip 70, thereby separating the rubber strip 70 into at least two portions. Any other device for cutting a reinforced rubber strip may be used. Referring to FIG. 1, the belt cutter 42 is preferably adapted to cut the rubber strip 70 at an angle relative to the lengthwise direction of the rubber strip 70, and preferably an angle corresponding to a preferred bias angle $\alpha$.

In accordance with one aspect, transfer tooling 120 having a main body 140 is adapted to lift the strip from the first conveyor 31 and place the strip onto the second conveyor 32. As explained further below, a fluid supply 125 may selectively provide a vacuum force to the main body 140 to engage with the rubber strip 70 before the cut to assist with advancing rubber strip 70 for proper engagement with the belt cutter 42 (e.g., advancing rubber strip 70 under a guillotine-style knife or blade). After the cut, which occurs at a predetermined indexed amount, the fluid supply 125 is capable of providing a positive pressure to the main body 140 that blows the strip off the tooling, as described further in the embodiments of FIGS. 2A-6C below.

In one embodiment, the transfer tooling 120 has two axes of movement. A servo drive motor may be connected to the transfer tooling 120 by a timing belt and provides the horizontal axial movement through the belt cutter 42 as guided by the elongate support 180. A pneumatic cylinder may provide the vertical axis of movement that allows the transfer tooling 120 to pick up and drop off the strip material 70 and 71.

It is preferred that strip section 71 is placed such that its edge parallel to the cords slightly overlaps a second strip section 71, ensuring that the two strip sections 71 are desirably spliced. If needed, sensors or other technology may actively correct for position errors. The sequence of using the transfer tooling 120 to advance the rubber strip 70, having the belt cutter 42 cut the strip 70, and having the strip sections 71 overlap one another, is repeated until a desired dimension of the bias belt 72 is formed.

Figure 2A:
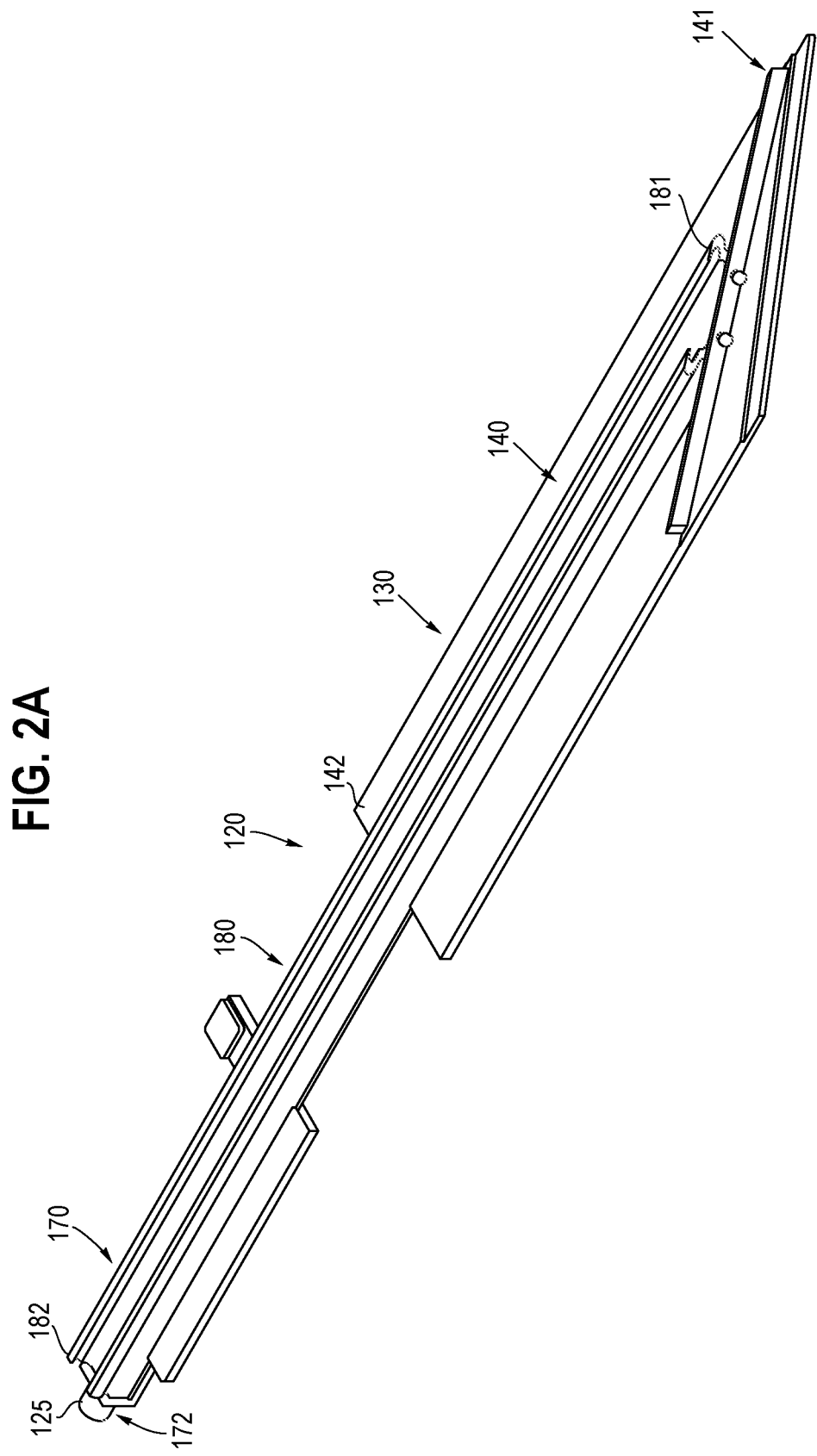

Referring now to FIGS. 2A-6C, a first embodiment of transfer tooling 120, which may be used to move strip 70 of FIG. 1 from the first conveyor 31, through the cutter 42 and towards the second conveyor 32, is shown and described. As shown in FIG. 2A, the transfer tooling 120 generally comprises a first segment 130 and a second segment 170. The first segment 130 comprises a main body 140 having a series of slots and holes, as best seen and explained further with respect to the bottom views of FIGS. 6A-6C, below. The series of slots and holes of the main body 140 of the first segment 130 enable a range of strip sections 71a and 71b to be selectively engaged with the main body 140, as explained further below. In contrast, the second segment 170 of the transfer tooling 120 lacks the main body 140 and does not engage the strip sections directly.

An elongate support 180 extends along a majority of the axial length of the first segment 130 and the second segment 170. A frontal region 181 of the elongate support 180 terminates adjacent to a frontal segment 141 of the main body 140 of the first segment 130, while a rear region 182 of the elongate support 180 terminates adjacent to a rear region 172 of the second segment 170, as depicted in FIG. 2A.

Figure 3:
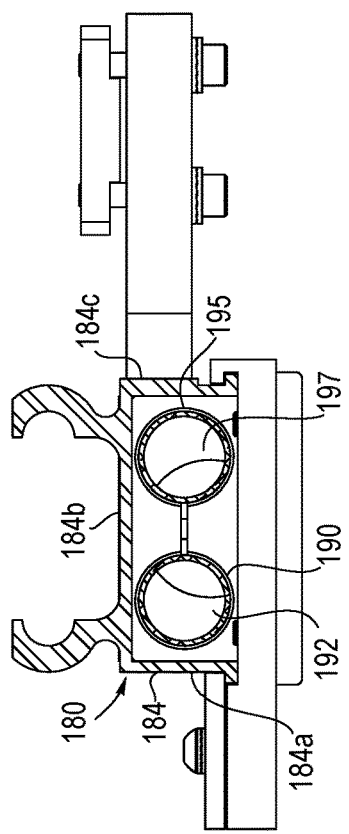
FIG. 3 is a cross-sectional view taken along line A-A of FIG. 2C.
Figure 4:
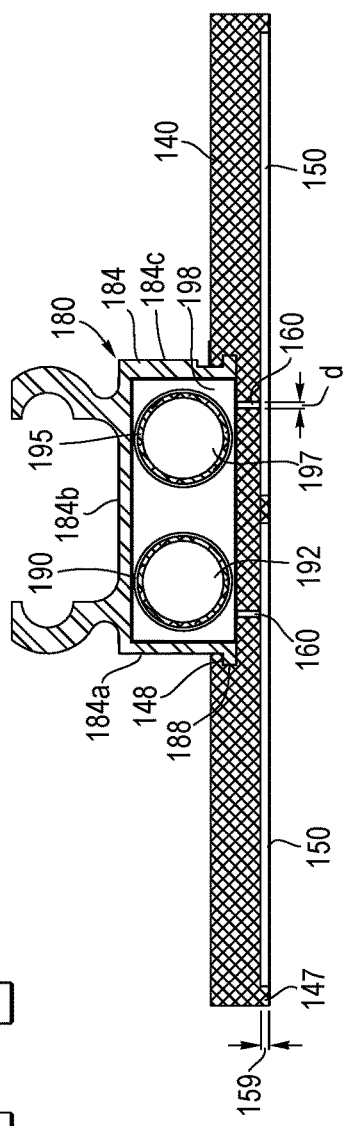
FIG. 4 is a cross-sectional view taken along line B-B of FIG. 2C.
Figure 5:
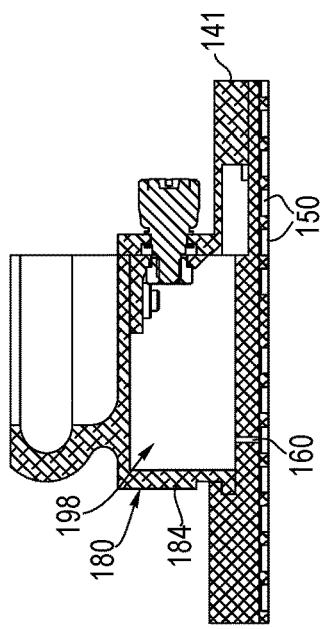
FIG. 5 is a cross-sectional view taken along line C-C of FIG. 2B.

The elongate support 180 comprises a housing 184 and at least one fluid communication chamber, as best seen in FIGS. 3-5 and described further below. In this example, the housing 184 comprises at least three wall segments 184a, 184b and 184c, as depicted in the cross-sectional views of FIGS. 3-5, and the at least one fluid communication chamber is at least partially contained within the three wall segments 184a-184c. A side of the housing 184 that is adjacent to the main body 140 may omit a continuous wall segment. As depicted in FIG. 4, a flange 188 of the wall segment 184a may securely engage a complementary flange 148 of the main body 140, thereby allowing sliding of the main body 140 onto the elongate support 180, such that the side of the housing 184 without a wall segment is held adjacent to the main body 140. The use of means, such as bolts, solder, welds, mechanical clips or the like, may be used to stabilize the elongate support 180 relative to the main body 140. In this manner, a chamber 198 is formed, which is generally bounded by the three wall segments 184a-184c of the housing 184, plus the exterior of the main body 140.

A fluid supply connection 125 is disposed near the rear region 182 of the elongate support 180. The fluid supply connection 125 is coupled to each of a vacuum source and a compressed fluid source, which in turn supplies either vacuum pressure or positive compressed fluid pressure that travels along a length of the elongate support 180 towards the main body 140. The vacuum pressure is adapted to lift the strip material 70 off the first conveyor 31 and advance it through the cutting area and onto the second conveyor 32, while the positive compressed fluid pressure blows the strip segment 71 off the tooling after being cut by the cutter 42, as described further below.

In a presently preferred embodiment, as seen in FIG. 2B, FIG. 3 and FIG. 4, first and second tubes 190 and 195 span the second segment 170 of the transfer tooling 120, and further span at least a portion of the first segment 130 comprising the main body 140. In this example, the first tube 190 comprises a downstream endpoint 191 while the second tube 195 comprises a downstream endpoint 196, as best seen in FIG. 2B. Further, the first and second tubes 190 and 195 comprise channels 192 and 197, respectively, as best seen in the cross-sectional views of FIGS. 3-4.

In this example, the first and second tubes 190 and 195 are fully contained within wall segments 184a-184c of the housing 184, as depicted in FIGS. 3-4. However, in alternative embodiments, the first and second tubes 190 and 195 may only be partially contained within wall segments 184a-184c, or may be disposed outside of the wall segments 184a-184c along a length of the transfer tooling 120. Moreover, although elements 190 and 195 are described as tubes for ease of reference, it will be appreciated that such conduits need not comprise a tubular or cylindrical cross-sectional shape, and that other channels and shapes may be provided without departing from the spirit of the present embodiments.

In this example, the first and second tubes 190 and 195 may each deliver vacuum pressure or positive compressed fluid pressure from the fluid supply connection 125 towards the main body 140 of the transfer tooling 120. For example, a single hose coupled to the fluid supply connection 125 may split equally into the first and second tubes 190 and 195, such that the first and second tubes 190 and 195 effectively supply the same positive or negative pressure in tandem.

The first and second channels 192 and 197 may be placed in fluid communication at a downstream location with the chamber 198, as depicted in the cutaway segment of FIG. 2B and the cross-sectional view of FIG. 5. A control valve, such as a pneumatic valve, may control whether vacuum pressure or positive pressurized fluid is selectively supplied to the channels 192 and 197, and in turn to the chamber 198 and the main body 140.

As explained further below, in accordance with one aspect, the downstream endpoint 191 of the first tube 190 terminates at a location upstream relative to the downstream endpoint 196 of the second tube 192, as shown in the cutaway segment of FIG. 2B. After extensive experimental testing, it was determined that the performance characteristics for holding a wide array of strips 71 against the main body 140 was improved by staggering the downstream endpoints 191 and 196 of the first and second tubes 190 and 195, respectively, as opposed to both tubes terminating at the same upstream or downstream location.

Figure 6A:
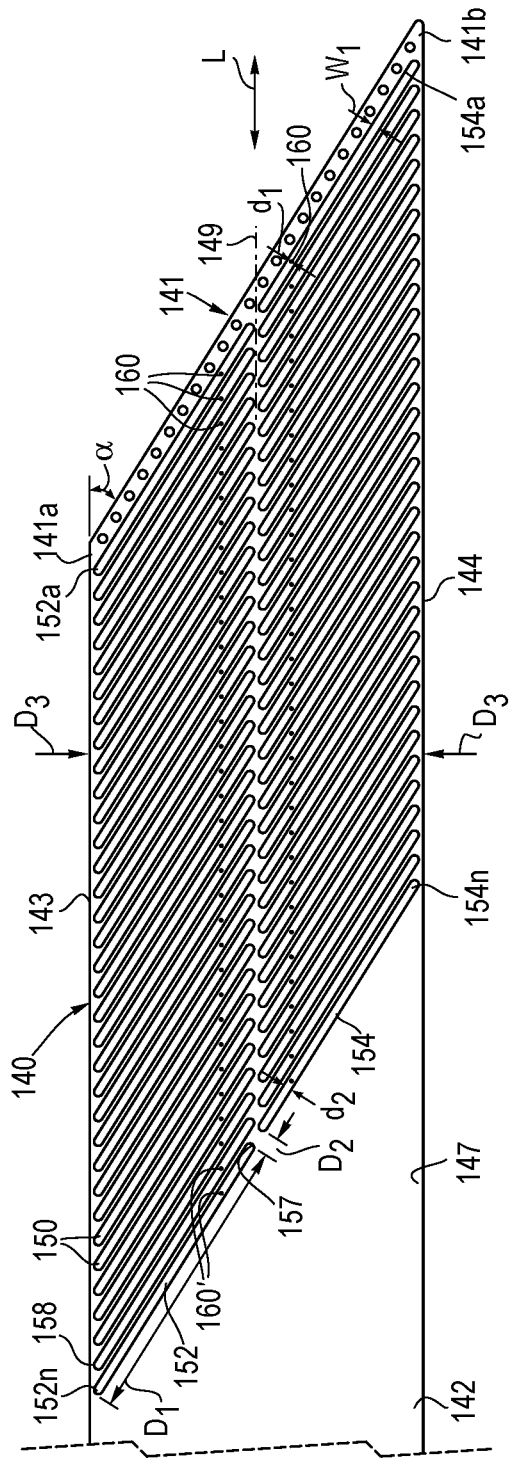
FIG. 6A is a bottom view of a main body of the transfer tooling of FIGS. 2A-2C.

Referring to FIGS. 6A-6C, further features of the main body 140 of the transfer tooling 120 are shown and described. In addition to frontal and rear segments 141 and 142, the main body 140 comprises two axial boundaries 143 and 144, which are spaced apart relative to one another. An axial centerline 149 is disposed equidistant between the axial boundaries 143 and 144, as depicted in FIG. 6A.

In this example, the frontal segment 141 of the main body 140 comprises an angle α relative to a main longitudinal axis L, since an end 141a of the frontal segment 141 terminates upstream relative to an opposing end 141b, as shown in FIG. 6A. The angle α may correspond to the bias angle of the belt being formed. In contrast, the two axial boundaries 143 and 144 are generally parallel to the main longitudinal axis L, while the rear segment 142 is generally perpendicular to the main longitudinal axis L, as shown in FIGS. 2A-2B and FIG. 6A.

The main body 140 further comprises a plurality of slots 150. In this example, the plurality of slots 150 are angled relative to the main longitudinal axis L. The angle of the slots 150 may be same angle α that the frontal segment 141 has relative to the main longitudinal axis L, or it may be a different angle.

A first series of slots 152 is disposed between the axial centerline 149 and the axial boundary 143, where for illustrative purposes the slot 152 closest to the frontal segment 141 is labeled 152a and the slot closest to the rear segment 142 is labeled 152n (regardless of the actual number of slots in this series). Similarly, a second series of slots 154 is disposed between the axial centerline 149 and the axial boundary 144, where for illustrative purposes the slot 154 closest to the frontal segment 141 is labeled 154a and the slot closest to the rear segment 142 is labeled 154n.

The main body 140 further comprises a plurality of openings 160. In this example, one opening 160 is placed in fluid communication with a respective slot 150, as seen in FIG. 6A.

As best seen with reference back to the cross-sectional view of FIG. 4, the slots 150 extend a depth 159 into a lower face 147 of the main body 140. Each opening 160 extends between its respective slot 150 and the chamber 198, as seen in FIGS. 4-5. As described above, the first and second channels 192 and 197 are placed in fluid communication at their downstream locations with the chamber 198, and therefore vacuum or positive pressures provided through the first and second channels 192 and 197 are ultimately routed to the slots 150, by way of the chamber 198 and the openings 160 as intermediary pathways.

In this manner, a strip 71 is held adjacent to the lower face 147 of the main body 140 when vacuum forces are provided to the slots 150, and conversely the strip 71 will be blown off the lower face 147 of the main body when a positive pressure is provided to the slots 150.

In accordance with one aspect, extensive amounts of experimental testing has resulted in the unique placement and sizing of the slots 150 and holes 160 in a manner that can accommodate a wide range of strip dimensions, without any adjustments by a user. For example, FIG. 6B shows a first strip 71a that spans a relatively long length, and in fact is depicted as spanning each of the slots 152a though 152n and further slots 154a through 154n. In FIG. 6C, an alternative strip 71b spans a shorter length than the strip 71a, i.e., the strip 71b begins at slots 152a and 154a, but terminates prior to slots 152n and 154n.

In past designs, an internal slide was provided that required user intervention to adjust the internal slide each time strips of different dimensions were selected for use, e.g., the strip 71a versus the strip 71b. If the internal slide was not adjusted properly, it could yield a lack of vacuum pressure sufficient to allow the strip to be picked up and placed by the transfer tooling. Specifically, if the internal slide was adjusted so more slots were open than the desired strip length, then the open slot areas that are not touching the strip will not allow a sufficient vacuum pressure to be generated adjacent to the strip, and the strip will not be picked up. On the other hand, if the internal slide was adjusted to be narrower than the strip length, then the leading edge of the material will not have sufficient vacuum pressure to pick it up, and the material will roll-up when the transfer tooling attempts to move the material.

In the present embodiments, the placement and sizing of the slots 150 and holes 160 provides sufficient pressure to hold and blow off strips of varying dimensions, such as strips 71a and 71b, without the need for an internal slide, or any adjustment to the transfer tooling 120 whatsoever. In other words, the mere selection of the placement and sizing of the slots 150 and holes 160 has been optimized to provide pressures sufficient to handle an enhanced number of strips. Still further, the level of pressure provided to the chamber 198, and thus the slots 150, does not need to change for strip 71a versus strip 71b.

As one important feature of the present embodiments, each hole 160 is provided to communicate with a respective slot 150. In other words, each hole 160 is confined to a location between an inner boundary 157 of a specific slot 150 and an outer boundary 158 of the same slot 150, as shown in FIG. 6A. In contrast, in prior designs, single holes were placed centrally in-between adjacent slots, but not in the slots themselves, where as noted above an internal slide was adjusted based on a strip size to supply positive or negative pressure to the slots.

In accordance with another aspect, by omitting centrally located holes of prior designs, which were not within slots at all, the slots of the present invention extend a longer length D1 towards the axial centerline 149 of the main body 140. Therefore, a distance D2 between slots in the same row has been reduced considerably compared to previously known designs. In the example of FIG. 6A, the distance D2 is less than one inch, and preferably less than 0.5 inches. In this specific embodiment, the distance D2 is about 0.375 inches. In short, the extensive testing has revealed that by moving slots within the same row considerably closer to one another, the main body 140 is optimized to handle an enhanced number of strips 71 without the need for an adjustment of an internal slide.

Notably, the two axial boundaries 143 and 144 of the main body 140 are spaced apart a distance $D_3$ relative to one another. In one example, where the distance $D_3$ is about 7.75 inches, the distance $D_1$ is about 5.1 to 5.2 inches and the distance $D_2$ is about 0.375 inches.

In practice, the distance $D_3$ may be varied dependent upon the incoming strip width being manufactured, and in turn the length of the slots $D_1$ may change along with the distance $D_3$ based on the strip width being processed. However, the distance $D_2$ between slots in the same row may be a fixed dimension for different sizes of the transfer tooling 120 regardless of strip width or bias angle. Testing by the applicant has demonstrated that a constant distance $D_2$ works well for numerous strip widths and bias angles, while the distances $D_1$ and $D_3$ are adjusted to be longer for wider strips and smaller for narrower strips.

In accordance with yet another aspect, a diameter d of the holes 160 (as best seen in FIG. 4) is in a range between about 15-60% of the width $w_1$ of the slots 150 (as best seen in FIG. 6A and labeled at slot 154a). In one embodiment, the diameter d of the holes 160 to the width $w_1$ of their respective slots is approximately 25-50%. Testing has revealed that such ranges are advantageous for handling an enhanced number of strips 71 without the need for an adjustment of an internal slide.

In accordance with yet another aspect, at least one hole 160 closer to the frontal segment 141 of the main body 140 comprises a diameter that is different than a hole closer to the rear segment 142. Specifically, a diameter $d_1$ of the holes 160 in the slots 152a and 154a in FIG. 6A may be greater than a diameter $d_2$ of alternative holes 160' in the slots 152n and 154n. In one non-limiting embodiment, the diameter $d_1$ of the holes 160 may be approximately 0.125 inches, thereby yielding an approximately 50% ratio of the hole diameter to the slot width in the slots 152a and 154a. By contrast, in the same example, the diameter $d_2$ of the holes 160' may be approximately 0.0625 inches, thereby yielding an approximately 25% ratio of the hole diameter to the slot width in the slots 152n and 154n, considering the width of the slots 152a and 154a remained the same as the slots 152n and 154n. Advantageously, such variable hole diameter allows the frontal row to be a wider percentage relative to the slot to provide sufficient pressure considering the strips 71 and 71b, regardless of size, will always be at the frontal segment 141 of the main body 140. On the other hand, since smaller strips (such as strip 71b) may not cover the rear slots, the design limits the amount of open space where pressure is lost should a strip not be present. In some embodiments, several of the frontal rows of slots (e.g., slots 152a and 154a plus the ensuing 2-8 rows) may comprise the larger hole diameters, while the remaining rows of slots may comprise the smaller hole diameters.

As noted above, the downstream endpoint 191 of the first tube 190 terminates at a location upstream relative to the downstream endpoint 196 of the second tube 195, as shown in the cutaway segment of FIG. 2B. After extensive experimental testing of tube placements, in conjunction with the hole and slot configurations described above, it was determined that the performance characteristics for holding a wide array of strips 71 against the main body 140 was improved by staggering the downstream endpoints 191 and 196 of the first and second tubes 190 and 195, respectively, as opposed to both tubes terminating at the same upstream or downstream location.

Referring to FIGS. 7A-7C, an alternative main body 240 is shown and described. The primary difference between embodiments is that in FIGS. 6A-6C the frontal region 141 and slots 150 of the main body 140 are angled relative to the main longitudinal axis L, while in FIGS. 7A-7C the frontal region 241 and slots 250 of the main body 240 are substantially perpendicular relative to the main longitudinal axis L. Like reference numerals in FIGS. 6A-6C correspond to like numerals in FIGS. 7A-7C, e.g., the slots 150 in FIGS. 6A-6C correspond to slots 250 in FIGS. 7A-7C. Notably, the operation of the transfer tooling and advantages for the design of FIGS. 7A-7C are generally the same as those discussed in detail with respect to FIGS. 6A-6C.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

I claim:

1. A transfer system configured to move a portion of a strip within a belt forming system, the transfer system comprising:
    a first segment comprising a main body adapted to engage a strip, wherein the main body comprises a first lateral boundary, a second lateral boundary, a front end, and a rear segment;
    a second segment coupled to a fluid supply;
    a plurality of slots disposed in a surface of the main body, wherein fluid communication is provided from the fluid supply to the plurality of slots, such that the fluid communication with the plurality of slots enables holding the strip against the main body or blowing the strip off the main body,
    wherein the plurality of slots are arranged in a series of rows, each slot in the series of rows extending, relative to the main body, laterally from the first lateral boundary towards the second lateral boundary and each row of the series of rows extending from the front end towards the rear segment, and
    wherein a first slot in a first row is positioned closer to the front end and a second slot in a second row is positioned closer to the rear segment; and
    a plurality of holes, wherein:
        a first hole provides fluid communication between the fluid supply and the first slot,
        a second hole provides fluid communication between the fluid supply and the second slot, and
        the first hole comprises a larger diameter than the second hole.

2. The system of claim 1, wherein the main body comprises a horizontal centerline disposed equidistant between the first and second lateral boundaries of the main body, wherein the first slot is positioned between the horizontal centerline and the first lateral boundary, and wherein the second slot is positioned between the horizontal centerline and the second lateral boundary.

3. The system of claim 1, wherein the first slot is, relative to the main body, laterally aligned with another slot and an inner boundary of the first slot is positioned less than 0.5 inches from an adjacent inner boundary of the other slot.

4. The system of claim 1, wherein a single hole is provided to each of the plurality of slots, such that there is a one to one correspondence of holes to slots.

5. The system of claim 4, wherein each of the holes are confined within a perimeter of their respective slots.

6. The system of claim 1, wherein the diameter of the first hole is in a range between about 25-50% of a width of the first slot.

7. The system of claim 1, wherein the first row is configured to engage strips having a larger dimension or strips having a smaller dimension, and wherein the second row is configured to engage strips having the larger dimension and to not engage the strips having the smaller dimension.

8. The system of claim 1, wherein an elongate support extends between a portion of the first and second segments, the elongate support comprising a housing, wherein first and second tubes are disposed within at least a portion of the housing, wherein the first and second tubes facilitate the fluid communication between the fluid supply and the plurality of slots.

9. The system of claim 8, wherein the first tube has a downstream endpoint that terminates at a location upstream relative to a downstream endpoint of the second tube.

10. The system of claim 8, further comprising a chamber disposed adjacent to the main body, wherein the chamber enables fluid communication between the first and second tubes and the plurality of slots.

11. A transfer system configured to move a portion of a strip within a belt forming system, the transfer system comprising:
    a first segment comprising a main body adapted to engage a strip, wherein the main body comprises a front end and a rear segment;
    a second segment coupled to a fluid supply;
    an elongate support extending between a portion of the first and second segments;
    a plurality of slots disposed in a surface of the main body, wherein fluid communication is provided from the fluid supply to the plurality of slots, such that the fluid communication with the plurality of slots enables holding the strip against the main body or blowing the strip off the main body; and first and second tubes extending along at least a portion of the elongate support, the first and second tubes facilitating the fluid communication between the fluid supply and the plurality of slots, wherein the first tube has a downstream endpoint that terminates at a location upstream relative to a downstream endpoint of the second tube, and wherein a first distance between the downstream endpoint of the first tube and the front end is larger than a second distance between the downstream endpoint of the second tube and the front end.

12. The system of claim 11, further comprising a chamber disposed adjacent to the main body, wherein the chamber enables fluid communication between the first and second tubes and the plurality of slots.

13. The system of claim 11, wherein the plurality of slots are arranged in a series of rows, wherein a first slot in a first row is positioned directly adjacent to a second slot in the first row.

14. The system of claim 13, wherein an inner boundary of the first slot is positioned less than 0.5 inches from an adjacent inner boundary of the second slot.

15. The system of claim 11, further comprising a plurality of holes, wherein a first hole provides fluid communication between the fluid supply and a first slot, and wherein at least one additional hole provides fluid communication between the fluid supply and a different slot than the first slot.

* * * * *

UNITED STATES PATENT AND TRADEMARK OFFICE
CERTIFICATE OF CORRECTION

PATENT NO. : 12,179,449 B2  
APPLICATION NO. : 17/003024  
DATED : December 31, 2024  
INVENTOR(S) : Eric William Gorham Page 1 of 1

It is certified that error appears in the above-identified patent and that said Letters Patent is hereby corrected as shown below:

On the Title Page

Item (56) IN OTHER PUBLICATIONS
Under Column no. 2, Line no. 2, "PCT/US20201047918,", should read -- PCT/US2020/047918, --

Signed and Sealed this
Fourth Day of March, 2025

Coke Morgan Stewart
*Acting Director of the United States Patent and Trademark Office*